United States Patent Office 2,962,083
Patented Nov. 29, 1960

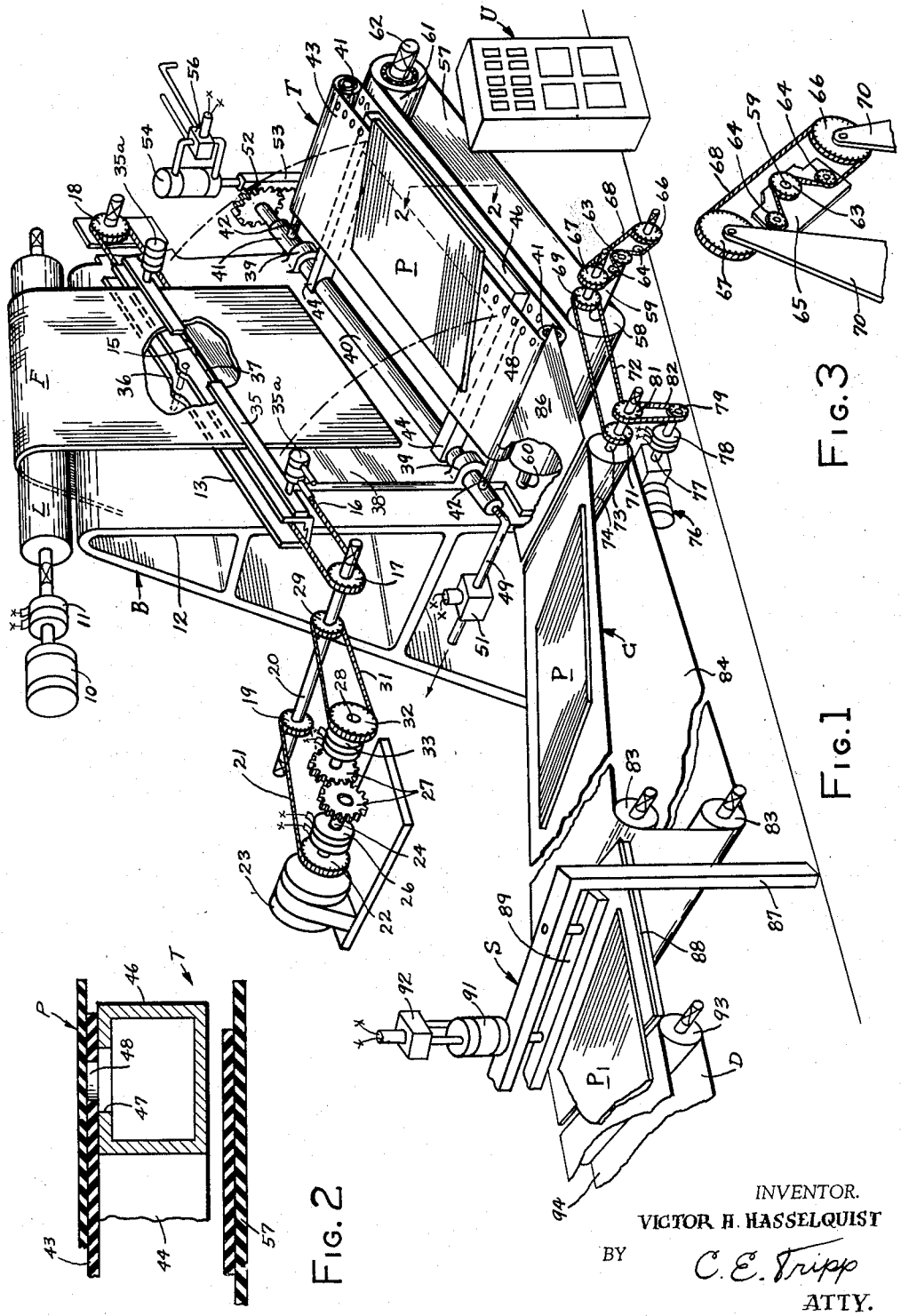

2,962,083

APPARATUS FOR TRANSFERRING BIAS CUT STOCK FROM A VERTICAL BIAS CUTTER TO A HORIZONTAL CONVEYOR

Victor H. Hasselquist, Akron, Ohio, assignor to The B. F. Goodrich Company, New York, N.Y., a corporation of New York Filed Mar. 11, 1958, Ser. No. 720,669

11 Claims. (Cl. 154—42)

This invention relates to the tire building art and more specifically to the conversion of a wide strip of rubberized cord fabric wherein the cords run longitudinally of the strip, to a long length of cord fabric wherein the cords extend transversely and on the bias. Such lengths are prepared to provide tire plies at the tire building drum, although the use of such a length is not limited to that application. The general operation involved is that of providing a long strip of rubberized cord fabric wherein the cords extend along the fabric, transversely cutting lengths off of the long strip at an angle that is known as the bias angle, transferring the cut lengths to a conveyor wherein the ends of the lengths that were formerly the sides of the main length of stock are joined together edge to edge along the cords to provide the single long length of bias-laid ply stock required. This length of stock is then usually wound up in a liner which is taken to the tire building drum where the plies are cut from the stock as required. Alternately the spliced length of ply stock may be fed directly to a tire building machine.

The apparatus that severs the main strip of fabric into bias cut lengths is known as a bias cutter and this invention relates to the employment of a vertical type bias cutter. These machines include a vertical backing or face plate, and a feed or letoff mechanism for intermittently advancing the stock vertically downward along the plate. A knife bar and traveling knife is set at the desired bias angle to sever the stock to the desired ply width while it is clamped by a clamp bar disposed along the knife bar. The clamp is then released and the severed ply must be transferred to the splicing table. One arrangement known in the art employs two combined splicing table-conveyor units both being served by a single vertical bias cutter. In this arrangement at least three operators are required, one for each splicing line and one for the bias cutter. The operator at the bias cutter grasps the severed ply length and throws it over to one of the splicing stations. The operator at that station must then straighten out and unfold the ply length and make a splice with the previously spliced length of stock. In the meantime the bias cutter has severed another length of stock which length has been tossed over to the operator at the other splicing station for straightening and splicing. In a typical installation, with this arrangement three operators can perform in the order of twelve splices per minute.

This system has several disadvantages which are overcome by the present invention. First, the ply stock is wrinkled and the cords may become distorted during the manual transfer process. Second, the splices may not be of uniform quality. Third, to obtain the desired production, that is, to realize the full capacity of the bias cutter, two splicing lines must be established. This involves cost of the extra splicing line and the services of an extra operator. This invention eliminates these difficulties and has the following advantages: (1) The severed plies are not wrinkled or distorted. (2) The splices may be made by an automatic splice apparatus which insures uniform quality and which is disposed some distance from the bias cutter. (3) The full capacity of the bias cutter may be absorbed by a single splicing line and conveyor line. (4) Only one operator is required to achieve the same production attained by the three operators needed in the previously described system, and even this operator is only a standby operator whose duty is to observe the operation of the apparatus and shut it down in case of possible mishandling of the stock or during replacement of a depleted stock roll. This system will be described briefly.

A vertical bias cutter of conventional commercial design is provided but it is modified slightly as will be explained. A belt conveyor, referred to as the transfer conveyor, is pivotally mounted along an axis parallel to the cutting bar. Means are provided to swing this conveyor from a vertical position flat against the stock at the bias cutter to a horizontal stock delivery position. This conveyor has a vacuum system for gripping the stock. This conveyor is free running but when it is in its lower or horizontal position it rests against the upper reach of an endless belt drive which can be intermittently driven to drive the transfer conveyor belt and advance the stock to a splicer head conveyor. At the end of the head conveyor is an automatic stock splicer, preferably a butt splicer, although the detailed nature of the splicer is not part of this invention. This machine receives the cut lengths of stock which are positioned by the feed conveyor against the trailing edge of a previously spliced length of stock and automatically performs a mechanical splice. There is a take-off conveyor for the butt splicer which advances the spliced length the proper distance to receive another cut ply. The butt splicer is automatically fed with precisely positioned stock so that there is no need for an operator to laboriously manipulate the stock under the splicing head as would be required if the same machine were disposed at the bias cutter and merely substituted for the hand splice operation referred to in the description of the previous system. Also the operator need not reach under the splicing head and so create a safety hazard as would be required if such a splicer were simply added to the prior system.

The system by which these advantages are obtained will be described in conjunction with a prospective drawing from which mechanical details and mere machine design elements are eliminated, for clarity. Splicers, including butt splicers, conveyor drives, and bias cutters are well known in the tire building art. Likewise, electro-magnetic controls, electric clutches, motors, electro-mechanical valves, and fluid pistons and cylinder assemblies are common in the tire building machine art, together with the necessary relays and timers hooked up to obtain any desired sequence of operation. These circuits are customarily worked out by ordinary electricians based on the desired cycle of operation specified by the designer or supervisory engineer. These details vary with every installation and even with a given installation will vary with different individuals assigned to assemble a control system. They form no part of the invention and accordingly the complex detailed circuit and wiring diagrams that result from the tying together of a large number of standard control units are not believed necessary in order that one skilled in the art may practice the invention.

In the drawings:

Fig. 1 is a prospective view of the complete system;

Fig. 2 is a section through the vacuum head taken from 2—2 of Fig. 1; and

Fig. 3 is detail of a sprocket drive.

The basic elements of the system

The basic elements of the system comprise a vertical bias cutter B having a stock let-off or feed system L, which advances the wide strip of cord fabric F down along the face of the bias cutter. A swinging transfer conveyor T is disposed at the lower edge of the advanced length of stock and transfers cut ply lengths P from the bias cutter face to a horizontal delivery position illustrated in Fig. 1. A splicer feed conveyor C receives the cut lengths and carries them to a butt splicer S which forms them into a single long length $P_1$ of spliced bias-laid cord fabric. This length is then advanced by a takeoff conveyor D for a distance equal to the length of a ply P. The various control elements are wired up as mentioned and are controlled by a master control panel U.

The bias cutter

The let-off roll L is disposed above the vertical face of the bias cutter and is driven by a motor 10, the output being controlled by magnetic clutch 11. This provides for intermittent feed of the strip of fabric F. The bias cutter has a vertical plate 12 and an elongated knife guide 13 which is set to the desired bias angle. A knife bar (not shown) slides in the knife guide and carries the knife 15. The knife may be rotated by drive means well known in the art. The knife bar and knife are reciprocated by a cable 16 driven by a pulley 17 at one end and passing over an idler pulley 18 at the other end. There is a reciprocating drive mechanism for the knife. This includes a forward drive sprocket 19 mounted on a forward and reverse drive shaft 20. The forward drive chain 21 is driven by the forward drive sprocket and the motor 23. Motor shaft 24 mounts the forward magnetic clutch 26 which can be energized to drive the sprocket 19 and released to let sprocket 22 idle. The motor shaft drives direction change gears 27 to operate the reverse drive shaft 28. The reverse drive shaft sprocket 29 on shaft 20 is driven by chain 31 and sprocket 32 on the reverse drive shaft. The reverse electro-magnetic clutch 33 cuts the reverse drive in and out as required. As is customary in bias cutters, a stock clamp bar 35 is provided for holding the severed stock until it is removed from the machine. The clamp bar is intermittently operated by cylinders 35A or their equivalent in the usual manner. The knife guide 13 is pivoted to the plate 12 by a pivot 36 to provide limited adjustment of the bias angle. The knife slot 37 in the knife guide is shown in the figure. All of the structure relative to the letoff and bias cutter thus far described is conventional and well known in the art and only the basic elements necessary to an understanding of the invention by one skilled in the art have been illustrated and described.

The transfer conveyor assembly

The transfer conveyor assembly is suspended by the bias cutter knife guide in order that it may assume the same angle as that of the knife guide. To this end a face plate 38 is attached to the knife guide and carries a pair of bearings 39 for mounting a hollow shaft 40, that supports the swinging portion of the transfer conveyor assembly. A pair of free running idler rolls 41 have shafts 42 extending from hollow shaft 40. A belt 43 passes around the rolls. In order to grip the severed ply of stock vacuum means are provided. This includes a pair of vacuum box support arms 44 bridged by a vacuum head 46 as seen in Fig. 2. The head is slotted at 47, which slot coincides with a row of apertures 48 formed in the belt 43. A vacuum line 49 connects to one end of hollow shaft 40 by a sealed swivel joint of any well-known design. This line is open or closed by a magnetic valve 51 in accordance with the desired cycle.

Means are provided to intermittently drive the belt 43 when it is in its lower horizontal position. The word "horizontal" as it is used in this specification and in the claims, refers to the axis of the rollers 41 and not to the plane of the belt 43 which is inclined to the horizontal plane because of the bias angle. The hollow shaft 40 is oscillated back and forth from the horizontal to the vertical position by suitable means such as a gear 52 mounted on the far end of the shaft, a rack 53 and a piston and cylinder assembly 54, controlled by a magnetic reversing valve 56.

In the preferred embodiment of the invention, the driving means for the conveyor belt 43 comprises a second belt 57 disposed beneath the swinging belt, and associted drive mechanism. This belt 57 passes over a drive roll 58 having a shaft 59 mounted in the face plate 38 as indicated at 60. At the other end of the belt is an idler roll 61 having a shaft 62 similarly mounted. The driving mechanism for the drive belt 57 comprises a sprocket 63 on shaft 59 of the drive roll, and a pair of small idler sprockets 64 are disposed at each side of the drive sprocket 63. Large idler sprocket 66 and a corresponding drive sprocket 67 are connected by a chain 68. Sprockets 66 and 67 are mounted in suitable bearings in a fixed position, that is they are fixed relative to the floor. Small idler sprockets 64 are mounted to move with the drive sprocket 63 by any simple bearing assembly such as that shown in Fig. 3 wherein a plate 65 surrounds the shaft 59 and mounts the idlers 64. Chain tension tends to center the position of the idlers and this arrangement permits the slight pivotal rotation required of the belt drive system when the bias angle is changed about pivot 36. Of course, suitable locking means are always provided to hold the knife guide at the selected bias angle, this being conventional structure not shown. The idler and drive sprockets 66 and 67 are supported by suitable brackets 70. In order to drive the belt 57 the sprocket 69 is fixed to the same shaft that carries sprocket 67. This is driven by a drive sprocket 71 and a chain 72. This drive sprocket 71 is mounted on a shaft 73 for the feed conveyor drive roller 74.

This assembly of transfer drive belt 57 and feed conveyor C is driven by a motor and gear reduction unit 76 having an output shaft 77. An electro-magnetic clutch 78 can couple the drive to a drive sprocket 79 which drives a driven sprocket 81 through chain 82. Driven sprocket 81 is mounted on shaft 73 for the driving roller 74. The feed conveyor C has a pair of idler rolls 83 and the usual belt 84. Thus the drive belt 57 and the feed conveyor belt 84 are driven at the same surface speed, but in opposite directions. The feed conveyor should be at least twice as long as the length of a severed ply but for compactness is shown broken away. In order to facilitate transfer of a ply from the transfer belt 43 to the feed conveyor belt 84, a pan 86 is provided to bridge the gap between these belts. Actually the width of the pan 86 is exaggerated in the drawing so that the parts beneath it can be separated for clarity of illustration.

The splicer and take-away conveyor

The preferred form of splicer employed is that shown in my copending application, Serial No. 498,313, filed July 17, 1956 entitled "Butt Splicing Sheet Material." Since details of the splicing mechanism are not part of the present invention, the splicer is illustrated diagrammatically but the splicer includes a frame 87, a table 88 for the stock, and a splicer head 89 mounted for vertical reciprocation against and away from the stock. This head includes a row of splicing jaws (not shown) as described in detail in my aforesaid copending application. The splicing head is raised and lowered by a piston and cylinder assembly 91, controlled by an electrical valve 92. For compactness of illustration, only the trailing end of the take-away conveyor D is shown, that is, the idler roll 93 and a section of belt 94. Of course, a suitable control and drive mechanism is provided, synchronized with the butt splicer. This completes the description of the essential elements of an apparatus forming applicant's novel system.

Operation

It will be assumed that the transfer belt is in the horizontal or delivery position and is either clear of a ply or is in the process of clearing one. The following steps will be described working from the bias cutter towards the splicer:

(1) A length of fabric F is fed down the face of the bias cutter until the desired ply width is attained. The feed motor 10 is then stopped.

(2) Clamp bar 35 closes and clamps the fabric.

(3) Knife 15 cuts through the fabric to create a ply length.

(4) Transfer belt 43 swings up and presses flat against the ply. The suction has been turned on by means of valve 51. This swinging action may or may not have been taking place while the stock was being cut, this being immaterial.

(5) Clamp C opens so that the transfer belt and vacuum is now supporting the stock.

(6) The transfer belt swings down to its horizontal position as illustrated in Fig. 1 and the suction is relieved.

(7) Motor 76 through clutch 78, drives the drive belt 67 and the feed conveyor C simultaneously. The upper reach of drive belt 57 is driven oppositely to the direction of the upper reach of feed conveyor belt 84, so that the ply P is transferred to the feed conveyor C.

(8) This action continues until the leading edge of a ply on the feed conveyor is brought against the trailing edge of a spliced length of stock $P_1$ whereupon the conveyors are stopped by means of clutch 78.

(9) The butt splicer head 89 descends, makes the splice, and retracts.

(10) The take-off and feed conveyors are again actuated to draw the spliced stock through the splicer until the trailing edge of the newly spliced ply is under the splicer head. The conveyors are then stopped again.

It will be noted that there need be no interlocking or mechanical connection between the bias cutter and the butt splicer. All that is required in this regard is that the butt splicers and conveyors be capable of splicing fast enough to insure that the ply on the transfer belt 43 is cleared before this belt starts to swing up against the bias cutter face to grip a new ply. Stated differently, the transfer drive mechanism for swinging belt 43, namely piston assembly 54 is synchronized with the feed, cut-off and clamp mechanism of the bias cutter, as outlined in steps 1 to 6. So long as the butt splicer action or cycle is faster than the synchronized bias cutter and transfer belt action, there can be no stock pileup. This is easily obtained because the butt splicer cycle is inherently shorter than the stock feed, bias cutter and transfer cycle occurring at the bias cutter. This explains why the system of this invention utilizes the full capacity of the bias cutter and yet requires but a single stock feeding and splicing line. It also explains why a single operator is all that is required, and his only function is that of stopping the machine in case of a stock pileup or in case of a stock shortage such as will occur when a new roll of fabric F is supplied to the bias cutter. Finally it will be apparent that the stock is gently handled without danger of cord distortion and wrinkle.

Having completed a detailed description of a preferred embodiment of an invention such that one skilled in the art may practice the same, I claim:

1. Apparatus for supplying bias cut lengths of rubberized fabric material to a splicer for splicing the lengths end to end, comprising a bias cutter having means for feeding a strip of rubberized fabric material substantially vertically, clamp means for the material, and means to cut off a length of material on the bias while the material is clamped; stock transfer apparatus comprising an endless belt assembly pivotally mounted at the lower end of said bias cutter for swinging motion about an axis parallel to that of the cut edges of the lengths of material and parallel to the direction of feed of said belt assembly, means to swing said belt assembly about said axis from a position against the vertically disposed material severed at the bias cutter to a substantially horizontal position, a stock splicer feed conveyor disposed lengthwise of said belt assembly and to feed in the same general longitudinal direction as the feed motion of said belt assembly, means in said stock transfer apparatus for gripping and holding a cut length of said material in place on the belt assembly during swinging of said belt assembly from its substantially vertical position at said bias cutter to its horizontal feed position, said gripping means engaging the material during said transfer on the side of said belt assembly which is directed upwardly in the horizontal position of said belt assembly, means to drive said belt assembly when it is in its horizontal position to transfer a length of material disposed thereon to said feed conveyor, and means to drive said feed conveyor at the same speed as that of said belt assembly to receive a length of cut material from the belt assembly and to feed the length of material to the splicer.

2. Apparatus according to claim 1 and further comprising support means rigidly interconnecting said bias cutter cut-off means with said belt assembly, said support means being mounted on the bias cutter for pivotal motion about an axis transverse to the feeding plane of the fabric material and located substantially at the midpoint of the line of travel of said bias cutter cut-off means.

3. Apparatus for supplying bias cut lengths of rubberized fabric material to a splicer for splicing the lengths end to end, comprising a bias cutter having means for feeding a strip of rubberized fabric material substantially vertically, clamp means for the material, and means to cut off a length of material on the bias while the material is clamped; stock transfer apparatus comprising an endless belt assembly pivotally mounted at the lower end of said bias cutter for swinging motion about an axis parallel to that of the cut edges of the lengths of material and parallel to the direction of feed of said belt, means to swing said belt assembly of said stock transfer apparatus about said axis from a position with a fabric-engaging side of the belt assembly against the vertically disposed material severed at the bias cutter to a substantially horizontal position, a stock splicer feed conveyor disposed lengthwise of said belt assembly to feed in the same general longitudinal direction as the feed motion of said belt assembly, a vacuum conduit means in said belt assembly and communicating apertures in said fabric engaging side of the belt assembly for gripping and holding a cut length of said material in place on the belt assembly during swinging of said belt assembly from its substantially vertical position at said bias cutter to its horizontal feed position, said side of the belt assembly on which said cut lengths of the material is carried being directed upwardly in said horizontal position of said belt assembly, means to drive said belt assembly when it is in its horizontal position to transfer a length of material disposed thereon to said feed conveyor, and means to drive said feed conveyor at the same speed as that of said belt assembly to receive a length of cut material from the transfer conveyor and to feed the length of material to the splicer.

4. Apparatus for supplying bias cut lengths of rubberized fabric material to a splicer for splicing the lengths end to end, comprising a bias cutter having means for feeding a strip of rubberized fabric material substantially vertically, clamp means for the material, and means to cut off a length of material on the bias while the material is clamped; an endless transfer conveyor belt assembly pivotally mounted at the lower end of said bias cutter for swinging motion about an axis parallel to that of the cut edges of the lengths of material and parallel to the direction of feed of said belt assembly and having a fabric-engaging side thereon, means to swing said belt assembly about said axis from a position in which said side of the belt assembly is against the vertically disposed material severed at the bias cutter to a substantially horizontal position, a stock splicer feed conveyor disposed to feed in the same general longitudinal direction as the feed motion of said belt assembly, vacuum conduit means disposed beneath said side of said belt assembly, apertures in said side of the belt assembly communicating with said vacuum conduit means for holding a cut length of said material in place on said side during swinging of said belt assembly from its substantially vertical position at said bias cutter to its horizontal feed position, means to drive said belt assembly when it is in its horizontal position to transfer a length of material disposed thereon to said feed conveyor comprising an endless driven belt which is engaged by a side of said belt assembly other than said fabric-engaging side thereof when the belt assembly is in its horizontal position, and means to drive said feed conveyor at the same speed as that of the belt assembly to receive a length of cut material from the belt assembly and to feed the length of material to the splicer.

5. Apparatus for supplying bias cut lengths of rubberized fabric material to a splicer for splicing the lengths end to end, comprising a bias cutter having means for feeding a strip of rubberized fabric material substantially vertically, clamp means for the material, and means to cut off a length of material on the bias while the material is clamped; an endless transfer conveyor belt assembly pivotally mounted at the lower end of said bias cutter for swinging motion about an axis parallel to that of the cut edges of the lengths of material and parallel to the direction of feed of said belt assembly and having a fabric-engaging side thereon, means to swing said belt assembly about said axis from a position in which said side of the belt assembly is against the vertically disposed material severed at the bias cutter to a substantially horizontal position, a stock splicer feed conveyor disposed to feed in the same general longitudinal direction as the feed motion of said belt assembly, means disposed at said fabric-engaging side of the belt assembly for holding and gripping a cut length of said material in place during swinging of said belt assembly from its substantially vertical position at said bias cutter to its horizontal feed position, said fabric-engaging side of the belt assembly being directed upwardly with the fabric piece resting thereon in the horizontal position of said belt assembly, means to drive said belt assembly when it is in its horizontal position to transfer a length of material disposed thereon to said feed conveyor comprising an endless driven belt which is engaged by a side of said belt assembly other than said fabric-engaging side thereof when the belt assembly is in its horizontal position, and means to drive said feed conveyor at the same speed as that of the belt assembly to receive a length of cut material from the belt assembly and to feed the length of material to the splicer.

6. A system for converting a wide continuous strip of rubberized cord fabric wherein the cords extend longitudinally of the fabric strip into a continuous length of rubberized cord fabric wherein the cords are laid transversely of the length and on the bias, comprising in combination a vertical type bias cutter, means for feeding the wide strip longitudinally along and down the face of the bias cutter, means for clamping the stock, means severing a length of stock from the strip at a bias angle to the edge of the strip, a belt assembly pivotally mounted for swinging movement to bring one side thereof to a vertical position flat against the severed length of bias-laid stock, stock grip means in said belt assembly, means to move said belt assembly from its vertical position against the face of the bias cutter to a horizontal delivery position with said side thereof directed upwardly and said stock positioned upon said side, while maintaining the stock in a flat gripped condition on said side of the belt assembly, a splicer feed conveyor, means for advancing said severed length of bias-laid stock from said belt assembly to said feed conveyor, a stock splicer at the terminus of said feed conveyor for successively joining severed lengths of bias-laid stock along the forward end cords thereof to a trailing end cord of a previously spliced length, and a take-off conveyor for intermittently advancing the previously spliced length of bias-laid stock by a distance equal to the length of an individual severed length of stock.

7. A system for converting a wide continuous strip of rubberized cord fabric wherein the cords extend longitudinally of the fabric strip, into a continuous length of rubberized cord fabric wherein the cords are laid transversely of the length and on the bias, transversely of the length of fabric, comprising in combination a vertical type bias cutter, means for feeding the wide strip longitudinally along and down the face of the bias cutter, means for clamping the stock, means severing a length of stock from the strip at a bias angle to the edge of the strip, an endless belt assembly pivotally mounted for swing movement to bring one side thereof to a vertical position flat against the severed length of bias-laid stock, apertures in said side of the belt assembly, vacuum stock grip means in said belt assembly communicating with said apertures, means to swing said belt assembly from its position in which said side thereof is in its vertical position against the face of the bias cutter to a horizontal delivery position with said side thereof directed upwardly and said stock positioned upon said side, while maintaining the stock in a flat gripped condition on said side of the belt assembly, a splicer feed conveyor, means to drive said belt assembly when it is in horizontal position for advancing said severed length of bias-laid stock from said belt assembly to said feed conveyor, a stock splicer at the terminus of said feed conveyor for successively joining severed lengths of bias-laid stock along the forward end cords thereof to a trailing end cord of a previously spliced length, and a take-off conveyor for intermittently advancing the previously spliced length of bias-laid stock by a distance equal to the length of an individual severed length of stock.

8. Apparatus for receiving and transferring bias cut fabric pieces away from the cutting mechanism of a vertical bias cutter, said apparatus comprising an endless belt assembly pivotally mounted along one edge of the assembly for swinging motion toward and away from a vertically hanging fabric sheet at the bias cutter, said belt assembly including a stock-engaging side which is adapted to be brought by said swinging motion of the assembly into a substantially vertical plane and against said fabric while a piece of such fabric sheet is severed by the bias cutter, and which side of the belt assembly is directed upwardly so that a bias cut fabric piece lies upon and is supported by said side as the belt assembly is swung pivotally to transfer said fabric piece away from the bias cutter, means for gripping and holding a bias cut fabric piece against said stock-engaging side during said swinging motion of the belt assembly away from the bias cutter, and means for driving the belt assembly lengthwise to feed said fabric piece endwise with the resulting movement of said stock-engaging side of the belt assembly when said belt assembly is swung to a position in which said fabric-engaging side is remote from the fabric at the bias cutter.

9. Apparatus for receiving and transferring bias cut fabric pieces away from the cutting mechanism of a vertical bias cutter, said apparatus comprising an endless belt assembly pivotally mounted along one edge of the assembly for swinging motion toward and away from a vertically hanging fabric sheet at the bias cutter, said belt assembly including a stock-engaging side which is adapted to be brought by said swinging motion of the belt assembly into a substantially vertical plane and against said fabric, vacuum gripping means exposed in said stock-engaging side of the belt assembly for engaging a piece of said fabric to said side stock-engaging side while such piece of fabric is severed by the bias cutter, said gripping means maintaining engagement with said side and said side being directed upwardly so that the severed piece of fabric lies upon and is supported on said side as the belt assembly is swung pivotally to transfer said fabric piece away from the bias cutter, means for releasing the gripping engagement of said vacuum means when said belt assembly is swung to a predetermined position away from the bias cutter, and means engageable with said belt assembly at said predetermined position thereof for driving the belt of said belt assembly lengthwise to convey said fabric piece endwise with the resulting movement of said stock-engaging side of the belt assembly.

10. Apparatus for receiving and transferring bias cut fabric pieces away from the cutting mechanism of a vertical bias cutter, said apparatus comprising an endless transfer belt assembly having a frame with parallel pulleys at opposite ends and a transfer belt trained endlessly about said pulleys, said transfer belt having an upper reach and a lower reach on opposite sides of said frame, means pivotally mounting said frame for swinging translational movement to bring the upper reach of said transfer belt into a substantially vertical plane and against a fabric piece hanging at the cut-off mechanism of the associated bias cutter, vacuum means between the reaches of said transfer belt, means communicating said vacuum means with the fabric-engaging side of the upper reach of said transfer belt when said upper reach is positioned against said fabric for engaging said fabric to the upper reach of the transfer belt while said fabric is severed by the bias cutter, means for swinging said frame of the belt assembly to bring the upper reach of said transfer belt to a predetermined location remote from said vertical position with said severed fabric piece supported upon the upper reach of said transfer belt, and a drive belt engageable with the lower reach of said transfer belt at said predetermined location, said drive belt being adapted to propel said transfer belt endlessly about its pulleys to advance a fabric piece thereon toward one of said pulleys.

11. Apparatus for receiving and transferring bias cut fabric pieces away from the cutting mechanism of a bias cutter, said apparatus comprising an endless belt assembly pivotally mounted along one edge of the assembly for swinging motion toward and away from a fabric sheet at the bias cutter, said belt assembly including a stock-engaging side which is adapted to be brought by said swinging motion of the assembly against said fabric to receive a piece of such fabric sheet severed by the bias cutter, means for gripping and holding a bias cut fabric piece against said stock-engaging side during said swinging motion of the belt assembly away from the bias cutter, and means for driving the belt assembly lengthwise to feed said fabric piece endwise with the resulting movement of said stock-engaging side of the belt assembly when said belt assembly is swung to a position in which said fabric-engaging side is remote from the fabric at the bias cutter.

References Cited in the file of this patent

UNITED STATES PATENTS

| | | |
|---|---|---|
| 1,472,895 | Wegner | Nov. 6, 1923 |
| 2,487,149 | Leguillon | Nov. 8, 1949 |
| 2,800,163 | Rusch | July 23, 1957 |